United States Patent [19]

Friedman et al.

[11] 4,275,034
[45] Jun. 23, 1981

[54] HYDROGENATION APPARATUS

[75] Inventors: Joseph Friedman, Encino; Carl L. Oberg, Canoga Park; Larry H. Russell, Agoura, all of Calif.

[73] Assignee: Rockwell International Corporation, El Segundo, Calif.

[21] Appl. No.: 71,897

[22] Filed: Sep. 4, 1979

Related U.S. Application Data

[62] Division of Ser. No. 887,566, Mar. 17, 1978, Pat. No. 4,206,032.

[51] Int. Cl.³ .......................... B01J 8/12; C10G 1/06; F27B 15/08; F27B 15/10
[52] U.S. Cl. .................................. 422/194; 422/208; 422/224; 422/232
[58] Field of Search ............... 422/198, 203, 207, 208, 422/224, 232, 194, 189 US; 48/77, 101, 197 R, 197 US, 210 US; 208/8 R

[56] References Cited

U.S. PATENT DOCUMENTS

| | | | |
|---|---|---|---|
| 2,664,402 | 12/1953 | Cromeans | 422/207 X |
| 2,790,838 | 4/1957 | Schrader | 422/198 X |
| 3,047,371 | 7/1962 | Krause et al. | 422/207 |
| 3,176,046 | 3/1965 | Kondo et al. | 422/198 X |
| 3,988,123 | 10/1976 | Coates | 48/210 X |
| 3,997,423 | 12/1976 | Greene | 208/8 R |

Primary Examiner—Bradley Garris
Attorney, Agent, or Firm—Clark E. DeLarvin; Henry Kolin

[57] ABSTRACT

Hydrogenation reaction apparatus comprising a housing having walls which define a reaction zone and conduits for introducing streams of hydrogen and oxygen into the reaction zone, the oxygen being introduced into a central portion of the hydrogen stream to maintain a boundary layer of hydrogen along the walls of the reaction zone. A portion of the hydrogen and all of the oxygen react to produce a heated gas stream having a temperature within the range of from 1100° to 1900° C., while the boundary layer of hydrogen maintains the wall temperature at a substantially lower temperature. The heated gas stream is introduced into a hydrogenation reaction zone and provides the source of heat and hydrogen for a hydrogenation reaction. There also is provided means for quenching the products of the hydrogenation reaction. The present invention is particularly suitable for the hydrogenation of low-value solid carbonaceous materials to provide high yields of more valuable liquid and gaseous products.

4 Claims, 2 Drawing Figures

HYDROGENATION APPARATUS

The Government has rights in this invention pursuant to Contract No. EX-76-C-01-2044 awarded by the U.S. Department of Energy.

This application is a division of application Ser. No. 887,566, filed Mar. 17, 1978, now U.S. Pat. No. 4,206,032, issued June 3, 1980.

BACKGROUND OF THE INVENTION

1. Field of the Invention

This invention relates to hydrogenation apparatus.

More particularly, this invention relates to an apparatus for reacting solid pulverized carbonaceous materials, such as coal, with heated hydrogen to form hydrocarbon liquids and gases suitable for conversion to fuels or for use as a chemical feedstock.

2. Description of the Prior Art

It is generally well known the conversion of coal to liquid or gaseous fuels is achieved by the addition of hydrogen. This may be accomplished by the direct contact of coal with hydrogen as in the Bureau of Mines Hydrane process to produce methane; by a catalyzed liquid-phase reaction with hydrogen to produce liquid products as in the Synthoil process; or indirectly by reacting coal with steam. Many different processes have been proposed and are under development. These schemes vary in the method of contacting coal with hydrogen or steam, and in the type of coal feed utilized. A solid, such as coal, can be contacted with a gas in three basically different ways. In the first, gas is forced through a fixed or slowly moving bed of solid. Another method of contact is by use of a fluidized bed. With sufficiently small solid particles and a sufficiently high gas velocity in vertical upward flow, the aerodynamic drag forces on the individual particles begin to approach the gravitational forces and the particles themselves begin to move about. The bulk properties of the gas solid mixture then become those of a fluid. Because of the improved heat and mass transfer characteristics in a fluidized bed as opposed to a fixed bed, most coal gasification processes now are the fluidized bed variety. Yet another basic category of gas solid contacting is entrained flow as in the Bigas process. In this regime, gas velocities are high enough and particle sizes small enough that the solid particles are carried along with the gas stream. An advantage of the entrained flow processes is the ability to utilize any grade or class of coal. Caking coals will agglomerate causing difficult problems when fed to fluidized or fixed bed systems. Further advantages of entrained flow with respect to gas production include operation at high temperatures so that tar production is kept to a minimum, adaptability to slagging conditions and high energy production per unit volume. The present invention is applicable to all of these types of processes, but is particularly applicable to an entrained flow coal conversion process.

U.S. Pat. No. 3,030,297 describes a process which comprises heating dry particles of coal entrained in a heated stream of hydrogen at total pressure of about 500–6000 psig from a temperature below about 300° C. to a reaction temperature in the range of from about 600° C. to about 1000° C. Two minutes are required to heat the coal particles to about 600° C. and then two to twenty seconds time at temperature for hydrogenation. The slow heat-up results from the main hydrogen stream being utilized to carry the coal into the reactor. The products of reaction are then cooled below reaction temperature to provide a product comprised of light oil, predominantly aromatic in nature, and hydrocarbon gases, primarily methane, ethane, and carbon monoxide.

A disadvantage of this process is that the coal particles entrained in the hydrogen are preheated prior to introduction into a heat chamber; thus, the reaction process is started upstream of the reaction chamber which may cause agglomeration and plugging within the conduit carrying the entrained coal. The present invention overcomes this agglomeration problem by providing two sources of gas. One source of gas, such as hydrogen, brings entrained coal into an injector at ambient temperature, and a separate source provides heated hydrogen to an injector which contacts the entrained dense phase coal downstream of an injector within a reaction zone, thereby starting the hydrogenation process within the reaction chamber and not upstream of the chamber.

A further disadvantage of the process shown in U.S. Pat. No. 3,030,297 is that it calls for the transfer of heat to the entrained coal particles through a tube wall. At the mass throughputs specified in the example, it is doubtful that enough heat could be transferred through the tube wall in a reasonable length to sufficiently heat the coal and, at the same time, use the tube wall to contain the system pressure. This type of reactor does not scale to the necessary larger diameters for commercial coal conversion reasonably because the heat transfer surface-to-volume ratio decreases rapidly with an increase in size.

Another patent, issued to Schroeder et al (U.S. Pat. No. 3,152,063), teaches a process which comprises dispersing pulverized and catalyzed coal, in the absence of a pasting oil, in hydrogen under a pressure of about 500 to 4000 psig, reacting the mixture of coal and hydrogen at a temperature in the range of about 450° to 600° C., for a gas residence time of less than about 200 seconds, cooling the reaction products and recovering liquid and gas hydrocarbon products therefrom.

Schroeder teaches passing of catalyzed coal and hydrogen into a two-stage reactor that consists of a multiplicity of parallel tubes axially extending within the reactor. The tubes are heated by a source of hot gas to start the reaction within the tubes. Vaporized oil and gas products are drawn off as well as unused hydrogen to a cooling device. The residual heavier oil and tar products are collected in the bottom of the reactor and a source of hydrogen may then be brought in to further hydrogenate these heavier products.

A disadvantage of this invention is that the pulverized coal must be passed through a catalyzing process, sent through a dryer and grinder and finally separated into minute particles by passing the coal through a screening process. The present invention utilizes finely-divided pulverized coal directly without the foregoing pre-treatment process. A further disadvantage of the prior art process is that it also utilizes the carrier hydrogen in the coal passages as the main source of hydrogen. The heat-up process then takes considerable time as compared to the present invention in that the carrier gas cannot be preheated prior to entering into a reaction chamber.

U.S. Pat. No. 3,960,700 suggests a process for treating carbonaceous material with hydrogen in the absence of an added catalyst. In accordance with the process disclosed therein a liquid or crushed solid carbonaceous material is added to a reactor where it is contacted with hot hydrogen in an amount to provide a hydrogen-to-material ratio varying from about 0.05 to about 4.0. The hydrogen and the carbonaceous material are reacted at a temperature from about 400° C. to about 2000° C. and a pressure of from about 3.4 to about 34 megapascals (500 to about 5000 psig). The reaction temperature is maintained by heating the hydrogen introduced to a temperature of about 50° C. above the desired reaction temperature. The reaction products are rapidly quenched to provide a total residence time of the reactants within the reactor of from about 2 milliseconds to about 2 seconds. This patent contains no specific teaching with regard to how the hydrogen is heated, referring only to "well known" processes. Presumably, therefore, the patent suggests conventional means such as indirect heat exchangers, electrical resistance heaters and the like.

U.S. Pat. No. 3,963,598 suggests a process for the flash hydrogenation of coal. In accordance with the process disclosed therein, substantially dry powdered coal having a particle size in the range of from about 50 to 500 microns is contacted with hydrogen gas at a temperature to produce a reaction temperature between about 500° C. and 800° C., and a pressure in the range of from about 6.9 to 28.4 megapascals (68 to 280 atmospheres). The reactants are contacted in a rotating fluidized bed for a coal residence time of not in excess of 5 seconds and hydrogen contact time not in excess of 0.2 seconds to produce liquid hydrocarbons which are rapidly cooled to a temperature sufficiently low to prevent further cracking of the liquid products. The only teaching of the method for heating hydrogen is a general reference to a hydrogen heating furnace and a statement in the example is the hydrogen temperature should not be over 1000° C. based on material limitations. Thus, this patent also contemplates conventional heating techniques.

In U.S. Pat. No. 3,997,423 there is discussed another process for a short residence time, low pressure hydropyrolysis of carbonaceous material. In accordance with the process disclosed therein, crushed coal is mixed with hot hydrogen at 500° C. to 1500° C. and 0 to 1.7 megapascals (250 psig) in a reactor and then, after a short reaction time, the reaction products are rapidly quenched. The total heat-up, reaction, and quench time is less than 2 seconds. It is alleged that this short residence time results in a high yield of coal tars. It is stated that "the heart of the invention resides in the concept of a short total residence time of the carbonaceous material in the reactor, at a low pressure between about atmospheric pressure and 250 psia." While this patent suggests the use of high temperature hydrogen as a means for maintaining and controlling the reaction temperature, it suggests no specific means for heating the hydrogen, and further teaches that the inlet hydrogen temperature should be approximately 50° C. higher than the desired reaction temperature.

More recently, in U.S. patent application Ser. No. 871,163 filed Jan. 20, 1978 and assigned to the Assignee of the present invention, there is suggested another coal liquefaction method and apparatus to produce hydrocarbon liquids and gases in accordance with the method disclosed therein. Pulverized coal particles entrained in a gas in a dense phase are injected into a reaction chamber at ambient temperature, a separate source of hydrogen at elevated temperature also is injected into the reaction chamber to raise the temperature of the coal, a portion of the hydrogen reacting with the coal to provide hydrogenation products which are rapidly quenched and collected. The total reaction time generally is in the range of from about 10 to 500 milliseconds.

Although the chemistry of coal pyrolysis and hydrogenation has been apparent for some time, no commercial scale reactor exists which efficiently utilizes the rapid-reaction regime. Some of the basic reasons for this appear to be a lack of adequate gas/solid injection and mixing technology, difficulty in meeting chemistry and residence time requirements, and agglomeration and plugging of the reactor. Hydrogenation of raw bituminous coal usually results in agglomeration, so that typical fluidized bed or moving bed reactors cannot be used as heretofore described. In addition, the requirement of short residence time (less than 1 sec) necessarily restricts the reactor to an entrained flow type. By maintaining rapid mixing, heat-up, and reaction of the coal near the point of injection and by maintaining hot reactor walls, the agglomeration problem can be avoided as taught in the aforementioned pending application.

Another significant disadvantage of coal hydrogenation processes of the entrained flow type is the amount of gas which must be heated to provide and maintain the desired temperatures in the reaction zone. More particularly, the temperature of the inlet gas must be maintained below about 1100° C. and generally below about 1000° C. to avoid the necessity of using exotic and expensive high temperature alloys for the materials of construction. Thus, a substantial amount of gas must be heated to maintain, for example, a temperature of around 650° to 950° C. in the reaction zone. Since only a small amount or portion of hydrogen introduced actually reacts with the coal, the economics of the process further require that the excess hydrogen be collected for recycling. In addition, the power requirements for transferring, collecting and compressing gas streams are substantial. Indeed, one of the principal obstacles standing in the way of a commercial process for the conversion of coal to valuable hydrocarbon products is that the energy required for conersion frequently amounts to from about 30% to 50% of the energy available from the coal. Clearly, therefore, there is a need for a process which is capable of converting coal into valuable liquid and gaseous products in which the energy requirements for such conversion are less than about 30% of the energy of the coal, and preferably less than 25%.

SUMMARY OF THE INVENTION

In accordance with the present invention, there is provided an apparatus for performing a hydrogenation reaction, and particularly wherein a carbonaceous material is hydrogenated and in which the hydrogen and energy requirements are substantially reduced. Broadly, the present invention comprises an apparatus for introducing hydrogen into a first reaction zone where it is contacted with from about 5 to 30 weight % of oxygen based on the total amount of hydrogen introduced. The hydrogen and oxygen react to raise the temperature of the hydrogen stream to from about 1100° to 1900° C. The oxygen is introduced substantially in the center of the hydrogen stream, and the hydrogen is introduced in such a manner as to provide a boundary layer of hydrogen across the face of the walls defining the reaction zone, whereby the materials of construction need not be exotic high temperature materials. A product gas stream comprising a major amount of hydrogen and a minor amount of water vapor leaves the first reaction zone and is introduced into a second reaction zone, where it is contacted with a stream of pulverized coal particles entrained in a gas such as hydrogen in a dense phase, said second stream being introduced at a temperature of from ambient up to about 200° C. Preferably, all of the oxygen will be reacted with hydrogen in this first reaction zone, so that there will be no free oxygen available to react with the coal in the second reaction zone. The hot hydrogen gas stream raises the temperature of the combined reactants in the second reaction zone to a temperature of from about 750° to 1150° C., a portion of the hydrogen reacting with the coal to form reaction products including liquid and gaseous hydrocarbon products. Where it is desired to maximize the production of liquid hydrocarbons, the reaction products are immediately introduced into a quench zone which is provided adjacent the reaction chamber to rapidly arrest the hydrogenation process within a predetermined time period after the reaction products exit the reaction chamber. A collecting means also is provided for collecting the reaction products from the quench zone. Alternatively, if it is desired to maximize the production of gaseous hydrocarbons, the quenching step may be omitted and the reaction may be allowed to substantially go to equilibrium.

In accordance with the present invention, even though a portion of the hydrogen is oxidized to provide the heat for increasing the temperature of the inlet hydrogen to a desired temperature, the total hydrogen throughput requirements are substantially reduced. Specifically, when a desired reaction temperature is maintained using heated hydrogen as the source of temperature control, it has been found that the ratio of hydrogen to coal is reduced by a factor of as much as 5 in accordance with the present invention. Since the hydrogen gas stream is introduced at a substantially higher temperature, the volume of hydrogen required to raise the total reaction mass in the second reaction zone to the desired temperature is substantially less. For example, in most of the prior art processes wherein hydrogen was used to heat the reaction products in a reaction zone, the hydrogen requirements are substantially in excess of 0.5 lb. of hydrogen per pound of coal introduced. By contrast, in accordance with the present invention wherein the hydrogen is heated to a temperature in excess of 1100° C. and preferably at about 1650° C. prior to introduction into the reaction zone, as little as 0.1 pound of hydrogen per pound of coal is required. It will be appreciated that this greatly reduces the thermal energy requirements for the process both in the amount of hydrogen which must be heated and, further, in the amount of hydrogen which must be cooled, compressed, recycled and reheated for return to the process. Indeed, in accordance with the present invention, the energy requirements for conversion of the coal to valuable gaseous and liquid products comprise only from about 25 to 30% of the thermal energy content of the coal, whereas in most of the prior art processes for an equivalent yield of product the energy requirements are from about 30 to 50% of the energy content of the coal.

The hydrogen is heated to a temperature of from about 1100° to about 1900° C. with the higher end of the temperature range being preferred. A particularly preferred temperature range is from about 1500° to 1650° C. The heating of the hydrogen may be accomplished solely by reacting a portion of the hydrogen with oxygen. Alternatively, in the interest of economy it may be preferred to preheat the hydrogen to a temperature of from about 650° to 900° C. by passing it in indirect heat exchange relationship with a hot fluid or by introducing it into direct heat exchange relationship with an electrical resistance heater. At least the final temperature increase of from about 900° C. up is provided by the reaction of a portion of the hydrogen with gaseous oxygen; at such elevated temperature no catalyst being required to initiate the reaction. The oxygen may be either pure gaseous molecular oxygen, oxygen enriched air, or air. In most instances it is preferred to use substantially pure oxygen, since the excess hydrogen will be recycled, and the nitrogen in the air would comprise an inert diluent which ultimately would require removal. In some instances, however, the use of air or oxygen enriched air may be preferred in the interest of economics or the availability of substantially pure oxygen.

In accordance with the present invention, the apparatus in which the oxygen and hydrogen are reacted utilizes rocket engine technology. Specifically, the oxygen is introduced into a central portion of a gaseous hydrogen stream, such that there is provided a boundary layer of unreacted hydrogen along the walls defining a first reaction zone. This boundary layer acts as a protective barrier to prevent excessive heat from being transferred to the walls of the reaction zone. Thus, it is possible to react the oxygen and hydrogen to produce a hydrogen and water vapor stream having a temperature of from about 1100° to 1650° C., while maintaining the wall temperature of the reaction zone at less than about 800° C. In addition, if desired, the incoming hydrogen gas may be passed in indirect heat exchange relationship with the first reaction zone to absorb heat therefrom and further assist in maintaining a desired low wall temperature. It is seen, therefore, that the present invention makes it possible to produce a high temperature gas stream in a reaction zone without the necessity of using high temperature materials for construction of the zone. The present apparatus can utilize conventional materials such as steel, stainless steel and the like.

A second reaction zone is provided downstream of the first reaction zone. The hot gaseous hydrogen is introduced into the second reaction zone and means are provided for introducing pulverized coal particles into the second reaction zone, entrained in a gas in a dense phase, as taught in copending application, Ser. No. 771,484 filed Feb. 24, 1977, now U.S. Pat. No. 4,169,128 and assigned to the present Assignee. The flowing coal particles are injected into the hot hydrogen stream in a manner to insure thorough mixing of the reactants. The mixing preferably is accomplished in a manner similar to that used in rocket engine technology wherein a plurality of streams of reactants are impinged upon one another, as taught in copending application, Ser. No. 871,068 filed Jan. 20, 1978 and since abandoned, and assigned to the present Assignee. Several streams of the flowing pulverized coal particles may be impinged upon one or more streams of hot hydrogen or vice versa; for example, by impinging four jets of coal particles into a single stream of hot hydrogen. The heated gaseous hydrogen and flowing pulverized coal particles are introduced in a ratio to provide a temperature within the second reaction zone of from about 750° to 1150° C. Particularly good results have been obtained when the temperature is maintained in a range of from about 800° to 1050° C. Generally, this is provided by introducing the hydrogen and coal at a rate such that the hydrogen-to-coal ratio is within the range of from about 0.5:1 to 0.1:1, with the lesser amount of hydrogen being required at higher hydrogen inlet temperatures. A particularly preferred operating mode is a hydrogen-to-coal ratio of from about 0.2:1 to 0.1:1 and an inlet hydrogen temperature range of from about 1500° to 1650° C. The pressure within the second reaction zone is not critical and may range from as low as 0.7 to as high as 34.5 megapascals, with a range of from about 6.9 to 13.8 being particularly preferred. The rate of introduction of reactants and sizing of the second reaction zone is so selected as to provide an average residence time of from 10 to about 5000 milliseconds, with a particularly preferred residence time within the second reaction zone being from about 20 to 1000 milliseconds.

The products of the reaction comprise unreacted coal and hydrogen, a small amount of water vapor, as well as the gaseous and liquid conversion products of the coal. The reaction products from the second reaction zone may be allowed to substantially go to equilibrium to maximize the yield of gaseous hydrocarbons, or may be subsequently introduced into a quench zone where they are cooled to reduce their temperature when it is desired to maximize the yield of liquid hydrocarbon products. For the latter purpose, the temperature should be reduced below about 650° C. within a time of from about 10 milliseconds to 100 milliseconds. Preferably, the reaction products are quenched using an indirect heat exchanger to permit recovery of the heat. When a rapid temperature reduction is desired, it may be necessary to use a direct contact quench such as a water spray. It will be appreciated that various other coolants could be used, such as a cold inert gas or various hydrocarbon liquids which could subsequently be recovered.

It is an advantage of the present invention that the hydrogen requirements for the process are substantially reduced, no catalysts are required, and the thermal energy requirements also are substantially reduced. Other advantages of this invention will become obvious from the following description of the preferred embodiments.

DESCRIPTION OF THE PREFERRED EMBODIMENTS

Figure 1:
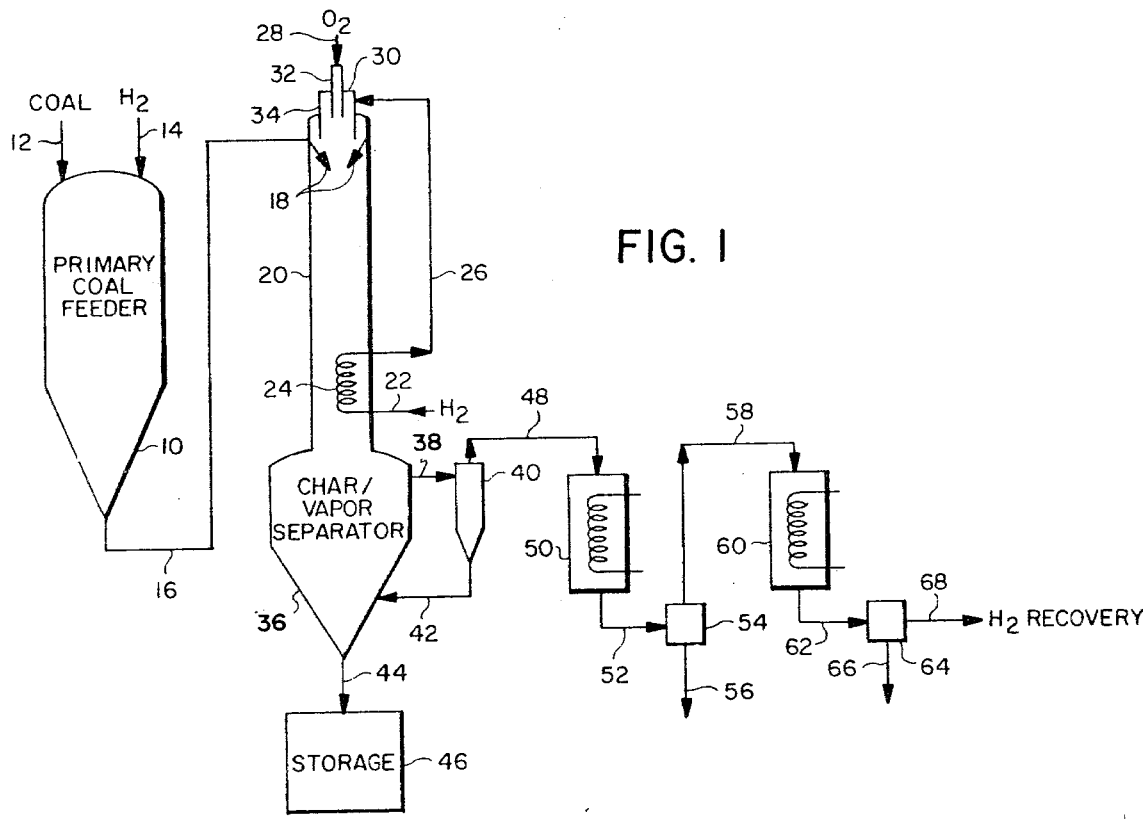
FIG. 1 is a flow sheet schematic for the coal hydrogenation system for practicing the present invention.

Referring now to FIG. 1, the invention will be described for convenience with reference to the hydrogenation of coal, although it will be apparent to those versed in the art the invention is equally applicable to any other carbonaceous material. Examples of suitable carbonaceous feed materials include coal, lignite, peat, oil shale, tar sands, crude oil, petroleum residua, and organic wastes. The organic wastes may be municipal waste, sewage sludge, wood chips, and the like. When the carbonaceous material is a solid, it preferably is crushed or ground to a particle size of less than about 200 microns, and generally to a median particle size within the range from about 25 to 100 microns.

The ground coal is introduced into primary coal feeder 10 through conduit 12. High pressure hydrogen also is introduced into the primary coal feeder 10 through conduit 14. The pressure in primary coal feeder 10 is maintained at from about 5 to 15% higher than the desired reaction pressure to provide the driving force for feeding the coal. The weight of hydrogen carrying the coal is a percent of the coal flow rate. Generally, it is about 0.5% for a reaction pressure of about 70 atmospheres. It will be appreciated, of course, that instead of using pure hydrogen, a mixture of hydrogen and an inert gas or an inert gas alone could be used for the transport of the coal, in which case the weight percent of the transport gas would vary according to the gas density.

A stream of solid particulate coal is withdrawn from primary coal feeder 10, passed through conduit 16 and a plurality of nozzles 18 for injection into hydrogenation reactor generally designated 20. Hydrogen (from a source not shown) is passed through conduit 22 and indirect heat exchanger 24 for introduction into reactor 20 via conduit 26. Oxygen (also from a source not shown) is introduced via conduit 28 into injector 30. Injector 30 comprises a central tube 32 through which the oxygen passes and which is circumferentially surrounded by outer housing member 34 into which the hydrogen is introduced. The oxygen may be introduced in an amount of from as low as about 5 to as high as about 150% based on the weight of hydrogen introduced; the higher amounts being required when the gas stream comprises a substantial amount of water vapor. The hydrogen and oxygen react completely to raise the temperature of the hydrogen stream and to assure that no free oxygen is available for reaction with the coal. The resulting high temperature gaseous reaction products proceed into reactor 20 where they are mixed with the incoming coal injected through nozzles 18. The resulting reaction products pass in indirect heat exchange relationship with heat exchanger 24, and then into char/vapor separator zone 36.

A stream of vapor reaction products containing some entrained solids is withdrawn via conduit 38 and introduced into a solid-gas separator 40 which may be a cyclone separator or the like. The separated solids are returned to char/vapor separator zone 36 via conduit 42. The char and solids from the separator zone 36 are withdrawn via conduit 44 for introduction into storage container 46. The char contained in storage container 46 is readily processed in accordance with known technology to provide hydrogen for use in the process.

Gaseous reaction products from separator 40 are withdrawn via conduit 48 and passed through heat exchanger 50 to condense and form a first liquid fraction having a boiling temperature greater than about 450° C. A mixture of gas and the first liquid fraction are withdrawn via conduit 52 and introduced into gas-liquid separator 54. The separated liquid products are withdrawn via conduit 56 for recovery. The gaseous products are withdrawn from separator 54 via conduit 58 and passed through a heat exchanger to condense a second liquid fraction having a boiling point of less than about 450° C. A mixture of residual gaseous products and condensed liquid is withdrawn from heat exchanger 60 via conduit 62 and introduced into liquid hydrogen gas separator 64. Liquid products are withdrawn from separator 64 via conduit 66 for recovery. The remaining gaseous products are withdrawn via conduit 68 and processed for recovery and recycle of the hydrogen. It will be appreciated by those versed in the art that this gas stream can also be further treated to recover residual hydrocarbon products as well as remove any undesired inert gases or contaminants.

EXAMPLE I

Figure 2:
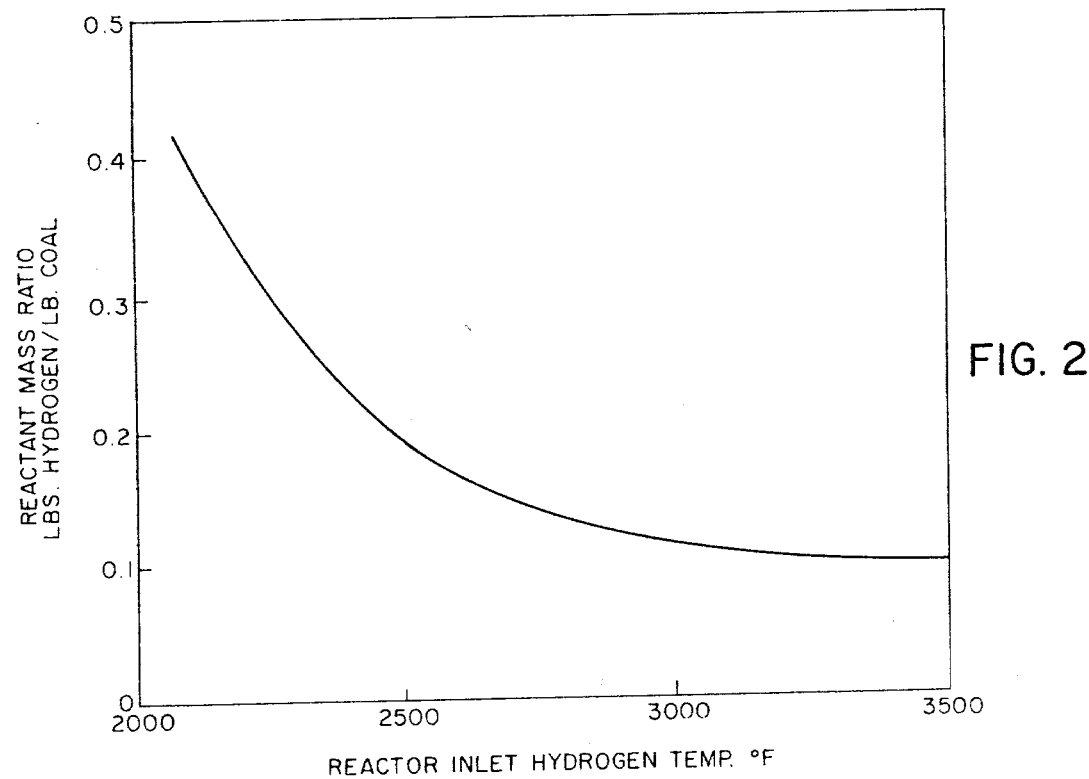
FIG. 2 is a graph depicting the mass ratio of hydrogen to coal required versus reactor inlet hydrogen temperature.

A series of parametric tests were run to study the effect of hydrogen inlet temperatures to the second zone on system hydrogen throughput requirements. The test apparatus was assembled to provide a process flow path substantially the same as that depicted in FIG. 1. The tests were run substantially identical as possible such that the principal variables were the inlet hydrogen temperature and the amount of hydrogen required to be introduced to maintain a desired reaction temperature in the second zone. Referring to FIG. 2, it is seen that the hydrogen throughput can be reduced to as low as 0.1 pound of hydrogen per pound of coal in accordance with the present invention.

It will, of course, be realized that various modifications can be made in the design and operation of the present invention without departing from the spirit thereof. Thus, while the principle of the invention, its preferred construction, and mode of operation have been explained and what is now considered to represent its best embodiment has been illustrated and described, it should be understood that within the scope of the appended claims the invention may be practiced otherwise than as specifically illustrated and described.

What is claimed is:

1. A two-zone apparatus for providing a source of heat and hydrogen in a first reaction zone for performing a hydrogenation reaction in a second reaction zone comprising:

a housing having walls and opposite ends defining the first reaction zone, a gas inlet to the housing located in one of said ends and a gas outlet from the housing located in the other of said ends, a first conduit attached to said gas inlet for introducing a stream of hydrogen into said first reaction zone via said gas inlet, a second conduit axially disposed within and circumferentially surrounded by said first conduit for introducing a stream of oxygen into a central portion of the hydrogen stream introduced at said gas inlet, said first and second conduits having relative cross-sectional flow areas to provide said oxygen stream in an amount from about 5 to 30 wt. % of said hydrogen stream, said conduits being further disposed relative to each other for maintaining a boundary layer of hydrogen along the walls defining said first reaction zone, heating means cooperatively associated with said hydrogen stream for heating said hydrogen to a temperature sufficient to initiate an exothermic reaction in said first reaction zone between the central portion of said hydrogen stream and said oxygen stream to produce a heated gas stream comprising a major amount of hydrogen and a minor amount of water vapor and having a temperature within the range of from about 1100° to 1900° C., while a boundary layer of unreacted hydrogen serves to maintain the wall temperature of said reaction zone at a substantially lower temperature than said heated gas stream, a hydrogenation reaction chamber adjacent to and downstream from said housing, said chamber having inlet and outlet ends and defining a second reaction zone, injector means located in the inlet end of said chamber for injecting a stream of the material to be hydrogenated into said second reaction zone, said injector means also being connected to and in fluid-flow communication with the gas outlet of said first reaction zone for receiving said heated gas stream from said first reaction zone and for injecting said heated gas stream into said second reaction zone and impinging said streams upon one another, said heated gas stream providing the source of heat and hydrogen for a hydrogenation reaction in said second zone, discharge means located in the outlet end of said chamber for discharging hydrogenation reaction products from said hydrogenation reaction chamber, and collection means adjacent to and in flow-communication with the discharge means of said hydrogenation reaction chamber for collecting said hydrogenation reaction products from said chamber.

2. The apparatus of claim 1 wherein the relative cross-sectional flow areas of said first and second conduits provide sufficient excess hydrogen from said first conduit to provide a boundary layer of hydrogen along the walls of said first reaction zone, said conduits being so disposed relative to each other so that said boundary layer of hydrogen maintains the wall temperature at less than 800° C.

3. The apparatus of claim 2 wherein said heating means for heating the hydrogen to a temperature sufficient to initiate an exothermic reaction between said hydrogen and oxygen comprises a heat exchanger located outside of said first reaction zone and in indirect heat-exchanging relationship with the hydrogen stream in said first conduit for preheating said stream of hydrogen in said first conduit to a temperature of from about 650° to 950° C. prior to introducing said hydrogen into said first reaction zone.

4. The apparatus of claim 3 further including quench means for rapidly lowering the temperature of said hydrogenation reaction products, said quench means being located intermediate the discharge means of said hydrogenation reaction chamber and said collection means.

* * * * *